United States Patent [19]
McIntosh et al.

[11] 3,766,459
[45] Oct. 16, 1973

[54] ELECTRONIC STEPPING DRIVE FOR DC TORQUE MOTOR

[75] Inventors: Michael D. McIntosh, Greencastle; Donald K. Scott, Jr., Zullinger, both of Pa.

[73] Assignee: Landis Tool Company, Waynesboro, Pa.

[22] Filed: Aug. 25, 1971

[21] Appl. No.: 174,840

[52] U.S. Cl. .................................. 318/603, 318/685
[51] Int. Cl. .......................................... G05b 19/28
[58] Field of Search .................... 318/603, 602, 685

[56] References Cited
UNITED STATES PATENTS

| | | | |
|---|---|---|---|
| 3,609,315 | 9/1971 | Rogers | 318/603 |
| 3,560,830 | 2/1971 | Steinberg | 318/602 X |
| 3,586,953 | 6/1971 | Markkanen | 318/603 X |
| 3,644,720 | 2/1972 | Falk | 318/603 X |

Primary Examiner—B. Dobeck
Attorney—Robert S. Smith

[57] ABSTRACT

A control system for a machine tool having a direct current motor capable of rotating the motor shaft in a series of discrete steps through a range and maintaining the shaft in position between the steps. The motor is controlled by a digital to analog converter which receives an input having a bi-directional digital counter. A pulse generator inputs a preselected number of pulses in a preselected direction; an encoder responsive to the angular position of the motor shaft produces a fixed number of pulses for a given rotation, and the pulses count the counter in a direction related to the direction of movement of the motor shaft. Circuitry is provided both to match a directional signal with each pulse to control the counter direction and also for buffering all of the pulses to prevent more than one pulse from reaching the bi-directional digital counter at substantially the same time.

5 Claims, 17 Drawing Figures

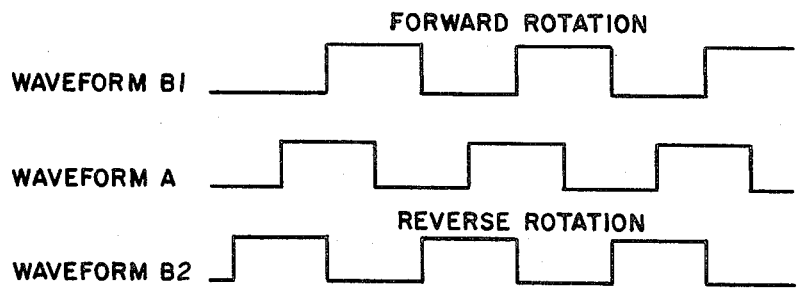
Fig_3
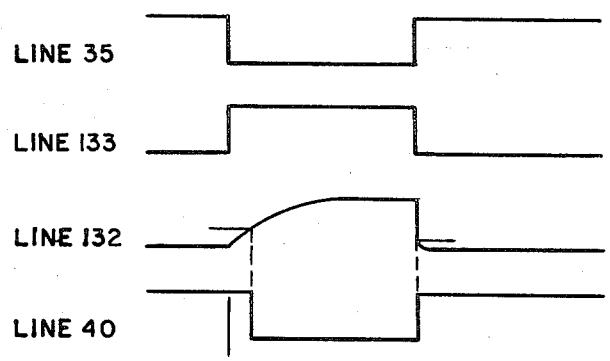
Fig_7
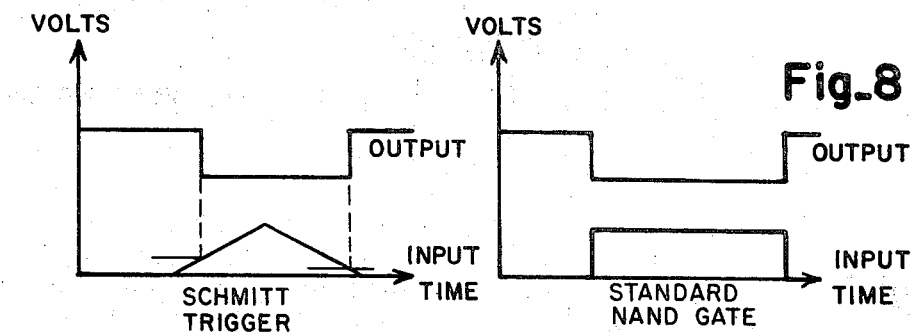
Fig_8
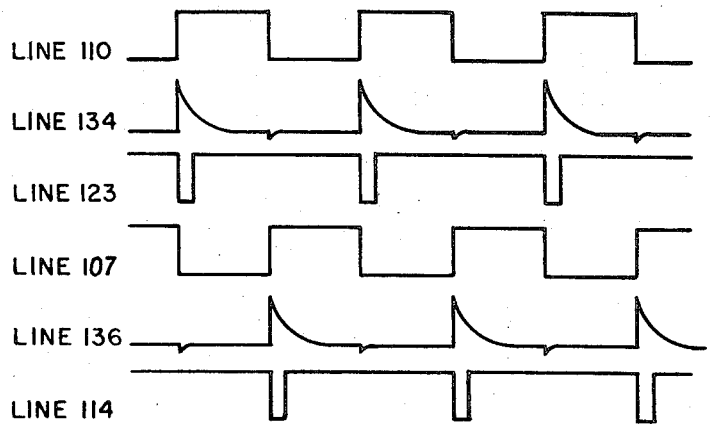
Fig_9
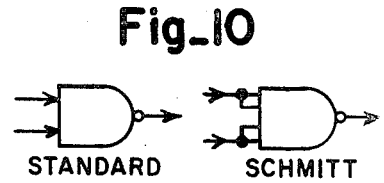
Fig_10

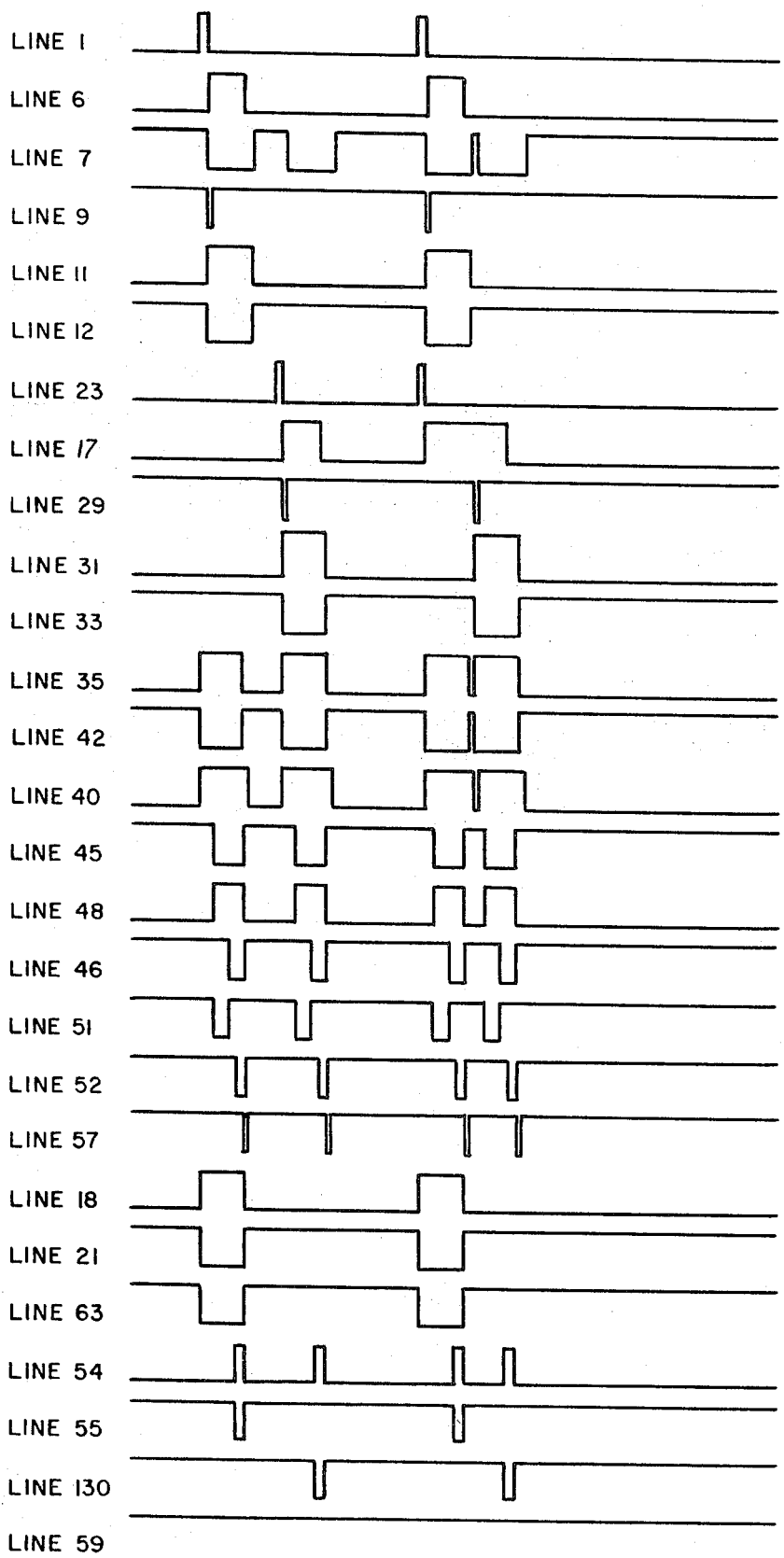
Fig_12

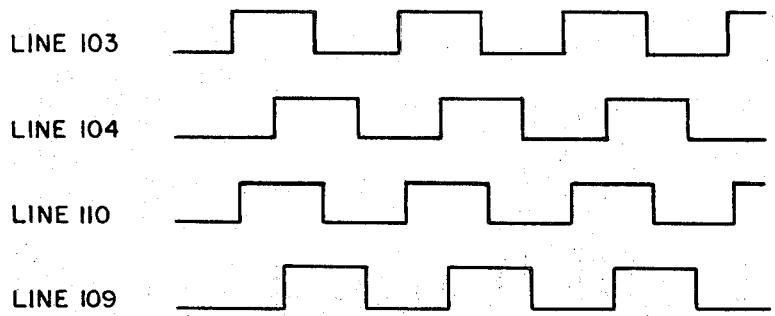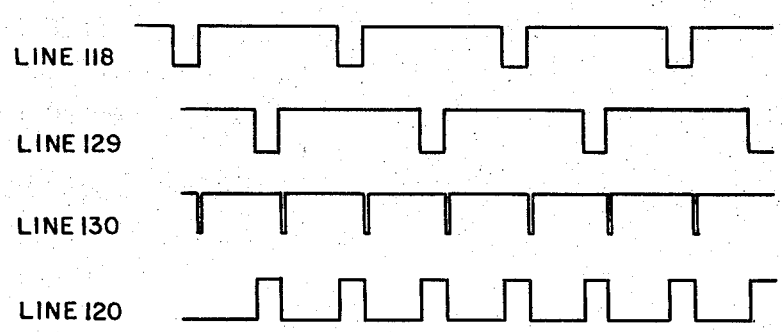
Fig.13
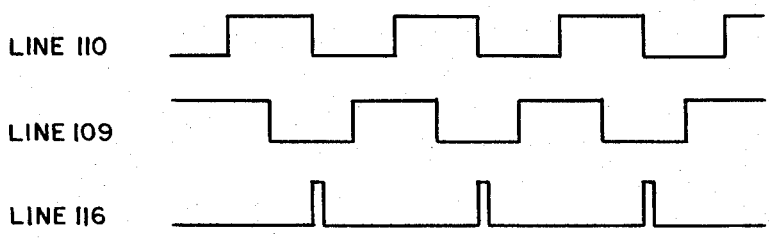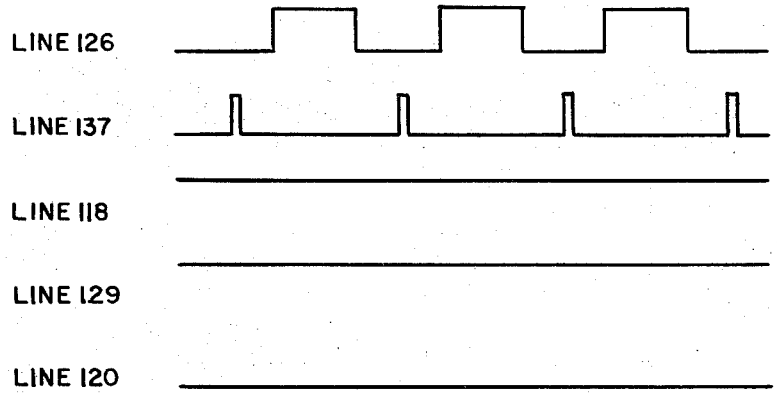
Fig.14

Fig_15

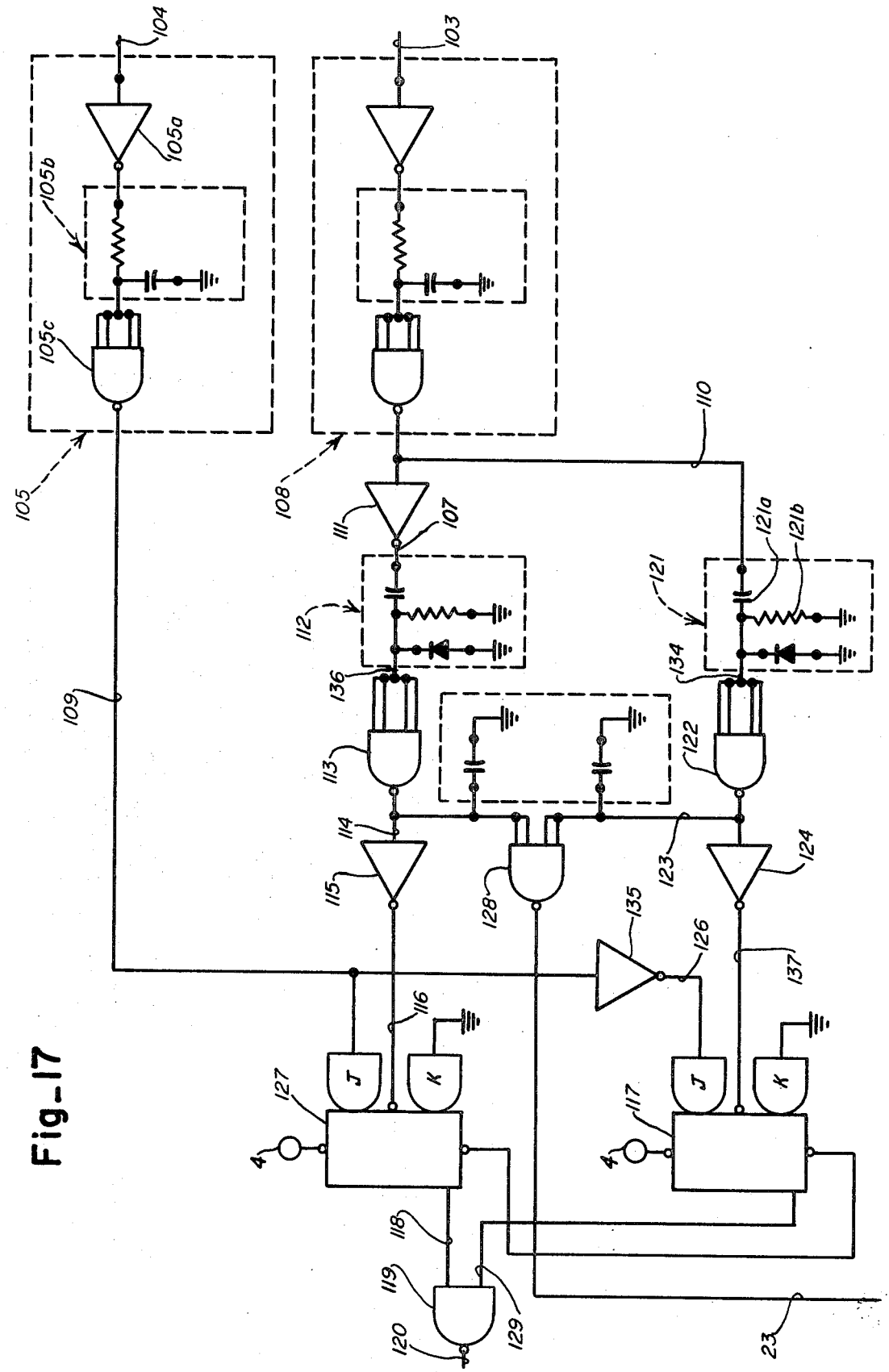

3,766,459

1

ELECTRONIC STEPPING DRIVE FOR DC TORQUE MOTOR

BACKGROUND OF THE INVENTION

This invention relates in general to new and useful improvements in a control system for providing a selectable variable feed rate for a machine tool element. In particular, the invention relates to a control system which utilizes a digital servo as an element of the control system.

In many prior art arrangements, a low torque output pulse motor was utilized to control the output of a hydraulic motor. The pulse motor was energized under the control of timed outputs from a combination of frequency dividers. This construction was necessary in the prior art to move a machine tool element, such as a grinding wheel assembly, because it is necessary to have a substantial torque output with precise angular control of the motor or output shaft. The prior art mechanism is cumbersome, more prone to malfunction, and relatively expensive to produce.

SUMMARY OF THE INVENTION

In accordance with the invention, the digital servo for a machine tool direct current motor for intermittently angularly positioning the motor or output shaft of a machine tool direct current motor, is a series of discrete steps through a range and maintaining the shaft in position between the steps, and includes a digital to analog converter having its output in a controlling relationship to the direct current motor. A bi-directional digital counter has its output in controlling relationship to the digital to analog converter and an output responsive to pulses; counting the bi-directional digital counter in a preselected direction. Encoder means is provided in a controlling relationship to the bi-directional counter which produces a fixed number of pulses during each revolution of the output shaft.

In the preferred embodiment, the apparatus also includes means for amplifying the output of said digital to analog converter, whereby the signal provided to the direct current motor is greater, and also means for buffering said pulses from said encoder and said means for counting which prevents more than one pulse from reaching the bi-directional digital counter at substantially any one time. Additionally, the apparatus includes means for discriminating pulses from the encoder and the means for counting and generating a distinctive direction signal contemporaneously with each pulse. The distinctive direction signal is in a controlling relationship to the direction input of the bi-directional digital counter.

Most preferably, the encoder produces two pulse trains, one of said pulse trains lags behind the other during rotation of the motor or output shaft in one direction, and leading the other pulse train during rotation of the output shaft in the opposite direction. Bi-directional counter means are provided for initializing the digital to analog converter to control the reference angular position of the output shaft.

Accordingly, a primary object of this invention is to provide a control for a direct current motor utilized in a machine tool which eliminates the necessity for a hydraulic motor and pump.

Another object is to provide a less expensive and more reliable control mechanism capable of extreme accuracy and high torque in the positioning of the output shaft.

A further object is to provide such a control mechanism which readily discriminates between noise spikes and pulses used to measure angular displacement.

BRIEF DESCRIPTION OF THE DRAWINGS

FIG. 3 is a diagrammatic view showing the phase relationship of the pulse trains produced by the encoder during forward and reverse rotation modes;

FIG. 7 is a diagrammatic view showing the relative waveforms on various lines in the anti-coincidence circuit;

FIG. 8 is a diagrammatic view showing the input and output of standard and Schmitt trigger nand gates and particularly, the hysteresis characteristics of the latter which are essential for noise rejection;

FIG. 9 is a diagrammatic view showing the waveforms on various lines in the motor count direction coincidence circuit;

FIG. 10 is a diagrammatic representation of Schmitt and standard nand gates;

FIG. 12 is a diagrammatic view showing the relative waveforms which appear on various lines in the anti-coincidence circuit and the count direction coincidence circuit;

FIG. 13 is a diagrammatic view showing the relative waveforms which occur on various lines in the motor count direction feedback circuit during forward rotation;

FIG. 14 is a diagrammatic view showing the relative waveforms which appear on various lines in the motor count direction feedback circuit during reverse rotation;

FIG. 17 is a diagrammatic view showing the details of the motor count direction feedback circuit.

DETAILED DESCRIPTION OF THE PREFERRED EMBODIMENT

Figure 1:
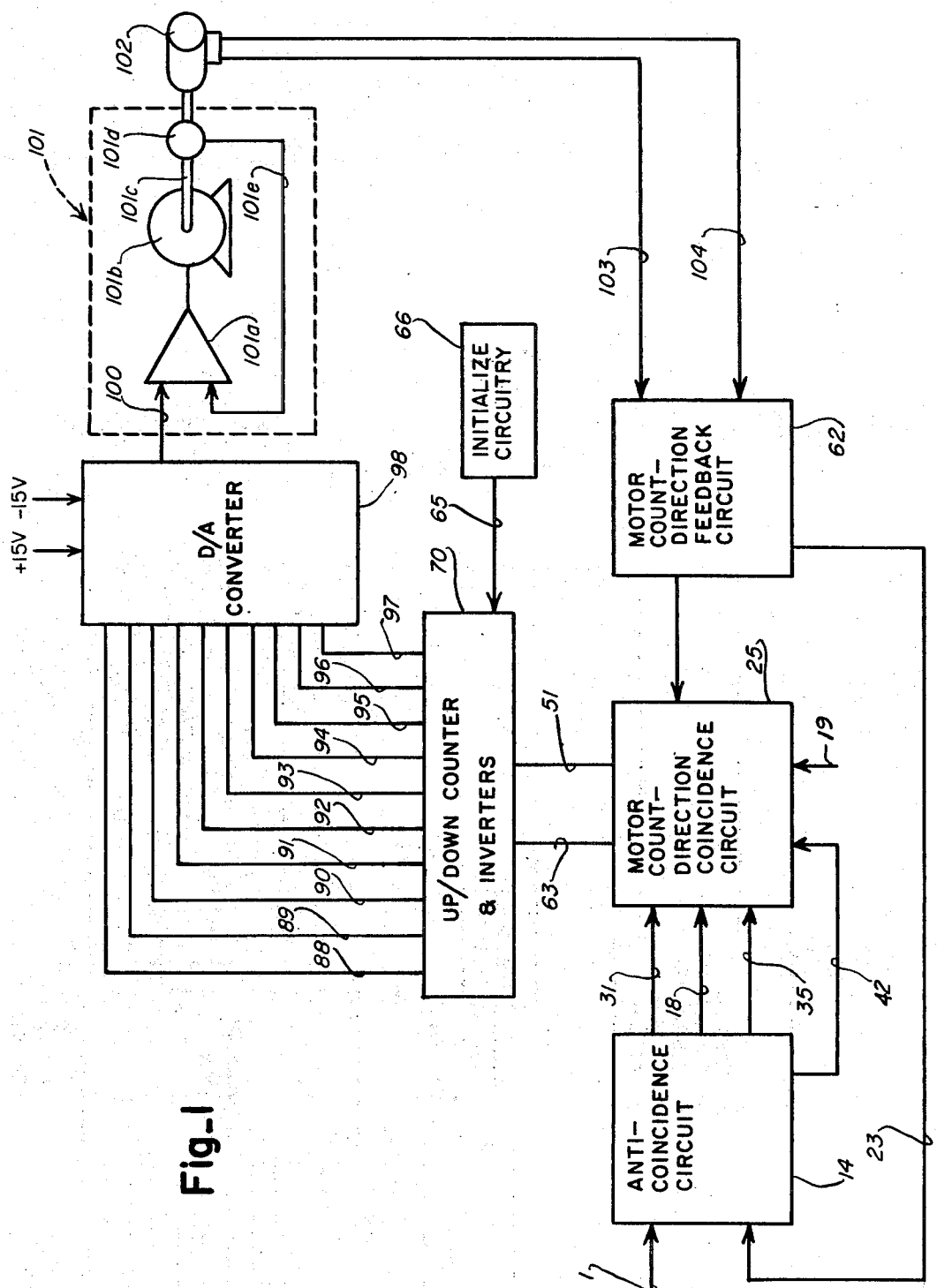
FIG. 1 is a diagrammatic view showing the over-all relationship of the motor, tachometer, encoder, and various required circuitry.

Referring now to FIG. 1, there is shown diagrammatically a system which includes a D.C. torque motor assembly 101 which includes a motor 101b having a motor or output shaft 101c operatively engaging a motor shaft encoder 102. In the preferred embodiment, encoder 102 produces two square waveforms that indicate how far the motor 101b has turned and in what direction it is turning. Each waveform has 100 equal wave periods during each shaft revolution; i.e. one waveform for each 3.6° of revolution. As will be apparent, means are provided to divide each waveform by two, to permit control with 1.8° control steps. The encoder 102 provides a feedback signal to indicate when the motor 101b has turned a preselected amount. Referring to FIG. 3, the encoder 102 produces a waveform A and either a lagging waveform B1 or a leading waveform B2, depending on the direction in which the motor 101b is turning. The lag or lead in each case is one-fourth of a wave period.

In the preferred form, a binary hexadecimal up/down counter 70 is provided which is operatively connected to the encoder 102. The counter 70 accepts a hexadecimal series input and provides an output sequence which is presented in a weighted binary code (8 – 4 – 2 – 1). Every up/down counter is capable of being counted in two directions, up (0, 1, 2, 3, 4, . . . ) and down (15, 14, 13, 12, . . . ) and responds to a direction signal having discrete voltage levels. A high voltage of +5 volts at the direction input line 63 of the counter 70 causes each positive input pulse to count the counter 70 up one count. A zero voltage or ground level at the direction input line 63 counts the counter 70 down with each input pulse. The counter 70 is counted by a voltage pulse applied to a clocking input line 51. A positive input pulse makes a transition of voltage from zero volts to +5 volts, remains at +5 volts for a finite time and then drops to zero volts again.

Figure 4:
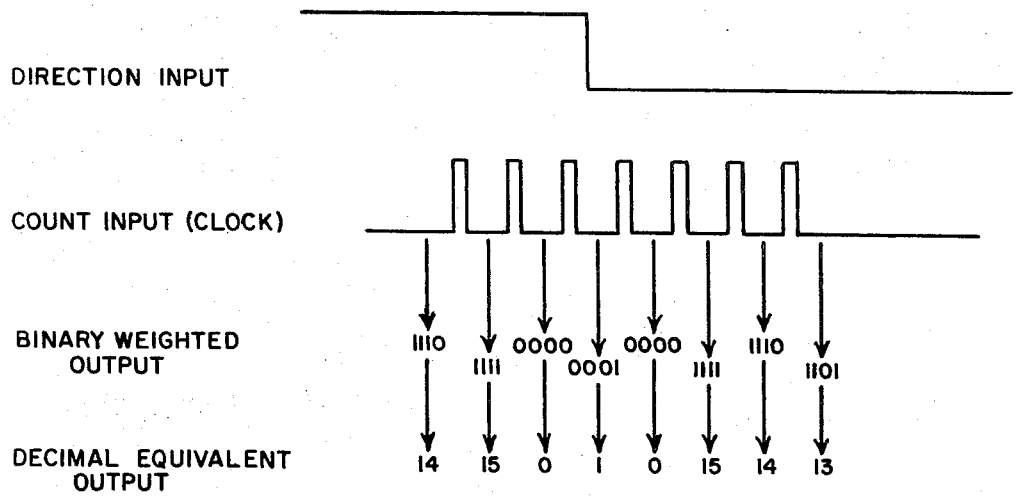
FIG. 4 is a diagrammatic view showing the relationship of the direction and count inputs and their effect on the binary and decimal equivalent outputs of a four bit bi-directional digital input counter.

An up/down counter with a four digit binary output (which may alternatively be used) of 0000 and a high direction input will count to a binary output of 0001 when the clock input receives one pulse. The second pulse counts the counter 70 to 0010, the third counts it to 0011 and the fourth counts the binary output to 0100 which is a binary weighted representation (8 – 4 – 2 – 1) of the decimal number four. The fifteenth input pulse produces an output of 1111. Then the next input voltage pulse will overload the counter 70 and force the binary weighted output to zero (0000). Any more input pulses will cause a four bit digital input counter to count up again just as though it had not overloaded. Should the direction input change, a bi-directional counter will start counting down with each input pulse rather than up. The down count will originate at the binary weighted output number at which the counter is resting at the time the direction changes. FIG. 4 is a diagrammatic representation of the binary weighted output counting up from 14 for 3 pulses and then down for 4 pulses for a four bit digital input counter.

The binary number in the up/down counter 70 is transmitted to a digital to analog or D/A converter 98 which converts the binary number to an analog voltage directly related to that number. More particularly, the D/A converter 98 is a bipolar D/A converter to provide for turning the motor shaft 101c of the D.C. torque motor 101b in the forward or reverse rotational mode. Every D/A converter possesses a given number of inputs, each capable of accepting bits of information of a binary weighted nature. Every bipolar variety D/A converter supplies a zero output analog voltage when the digital inputs rest at a binary value equal to one-half of the following quantity: one plus the maximum binary weighted input. If the D/A converter has a four bit digital input, the input would be all 1's in the weighted binary input configuration corresponding to the decimal number 15. Half of fifteen plus one is eight. Therefore, with the binary weighted representation of eight applied to the input of a four bit bipolar D/A converter, the analog output will rest at zero volts. When a digital binary number of zero is applied at the input of a four bit bipolar D/A converter, the analog output will deliver either its maximum positive or maximum negative voltage depending on whether the D/A converter is an inverting type. In the preferred embodiment, the D/A converter 98 is of the inverting type. As graphically represented in FIG. 2 at the zero binary input, the analog output of the D/A converter 98 is at its maximum positive voltage, i.e., +10 volts. When the maximum binary weighted input number is applied, i.e., each digital input is at high value, then the analog output rests at its maximum minus voltage, i.e., –10 volts. Any inputs between the minimum and the maximum cause an analog output voltage having a direct linear relationship to the digital input.

In the preferred embodiment, the D/A converter 98 has a ten bit input and is driven by the up/down counter 70 which is also a ten bit type. The ten bit up/down counter 70 comprises two and one-half four bit up/down counters in cascade relationship which are not separately represented. The ten bit up/down counter 70 is interfaced with the D/A converter 98 which contains a zero offset circuit to adjust the analog output of the D/A converter 98 to zero at the proper digital input. The means of interfacing the up/down counter 70 and the D/A converter 98 will be discussed hereafter.

Referring to FIG. 1, if it is desired that the motor or output shaft 101c turns two revolutions to move a given mass a certain distance, a pulse generator 60 is connected by a line 1 through an intermediate circuit (to be described hereafter) thereby to the up/down counter 70. The pulse generator 60 may be preselected to produce a given number of pulses. Selecting and supplying a pulse train of 400 pulses creates an imbalanced condition. Since the encoder 102 produces 200 pulses per revolution and 400 pulses are required to rebalance the system, the output shaft 101c must turn two revolutions. As will be described hereafter, the motor 101b will turn at a speed related to the analog voltage appearing at the output of the D/A converter 98. The output of the up/down counter 70 is converted to an analog voltage by the D/A converter 98 which produces an output on a line 100 which is amplified by an amplifier 101a to cause the output shaft 101c to turn. A positive analog voltage by the D/A converter 98 will turn the output shaft 101c in the forward direction. A negative analog voltage will cause the output shaft 101c to turn in the reverse direction.

In the preferred embodiment, the input pulses from the pulse generator 60 to the up/down counter 70 are delivered at 400 pulses per second. The chief demand for proper operation is that input pulses count the counter 70 in one direction while feedback pulses from the shaft encoder 102 count the counter 70 in the opposite direction. Loading the up/down counter 70 with input pulses at a rate of 400 pulses per second starts the counter 70 counting in one direction until feedback pulses from the encoder 102 starts removing counts from the counter 70. If input pulses are loading into the counter 70 at 400 pulses per second, the output shaft 101c will turn and cause the encoder 102 to produce pulses. As the number in the counter 70 increases, the output shaft 101c turns faster until the encoder 102 produces pulses at a rate of 400 steps per second. Then each input count placed into the counter 70 is removed by the feedback pulse and the counter 70 output stabilizes at two consecutive binary numbers counting up one, down one, up one, down one, causing the D/A converter 98 output to stabilize at a nearly constant value that turns the output shaft 101c at an angular rate corresponding to 400 pulses per second. Therefore, the motor 101b will step at a rate equal to the input frequency as long as the input frequency does not change or the input does not stop. If the motor 101b and the encoder 102 produce 400 pulses per second and there are 200 pulses per revolution, then the output shaft 101c is turning at a rate of two revolutions per second. Therefore, the input frequency determines the maximum speed at which the output shaft 101c can turn to move a given mass a given distance. Although a rough form of speed control is accomplished in this manner in the preferred embodiment, speed control of a D.C. torque motor can be achieved by other means if speed control is desired.

The application of 400 pulses at the line 1 by the pulse generator 60 at a frequency of 400 pulses per second with a count direction means, line 19, grounded, results in the input pulses being fed through an anti-coincidence circuit 14. The first pulse into the anti-coincidence circuit 14 produces two simultaneous pulses out at a count line 18 and a busy line 35. The busy line 35 signal indicates that the anti-coincidence circuit 14 is busy and any pulse that arrives at the other input line 23 to the anti-coincidence circuit 14 will be stored there until the anti-coincidence circuit 14 is not busy. As these input pulses at the line 1 pass through the anti-coincidence circuit 14 and arrive at the lines 18 and 35, they confront a count-direction coincidence circuit 25. Here each count pulse is matched with an appropriate generated direction signal. Since the input count pulse counts the counter 70 in one direction and the motor feedback pulse counts the counter 70 in the opposite direction, each pulse must be matched with a direction signal for the purpose of counting the counter 70 in the proper direction. Accordingly, each pulse passed by the anti-coincidence circuit 14 passes on the clocking input line 51 contemporaneously with a signal on the direction input line 63 to provide a high direction signal so that each input count pulse counts the up/down counter 70 up and causes the output of the D/A converter 98 to rise and start the motor 101b turning forward a little faster with each pulse. As the output shaft 101c starts turning, the encoder 102 starts delivering two pulse trains; one of which lags or leads the other to indicate how far the output shaft 101c has rotated and at what rate each 1.8° of movement occurred.

Figure 5:
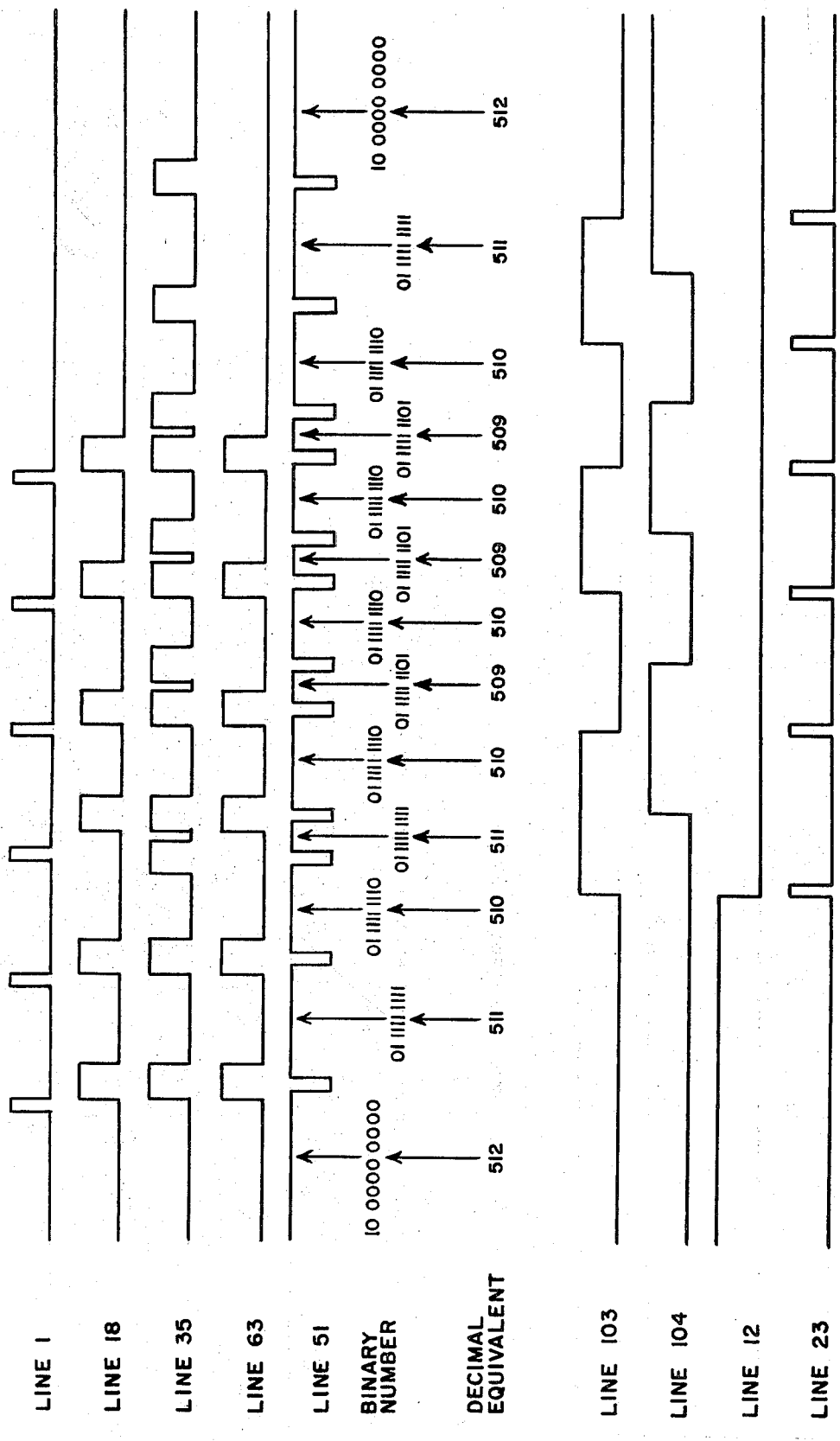
FIG. 5 is a diagrammatic view similar to that of FIG. 4 showing the relationship of the waveforms on various lines and the binary and decimal equivalent counts in a ten bit bi-directional digital input counter.

The waveforms A and B1 or B2 from the encoder 102 are conducted by the lines designated by the numerals 103 and 104 into a motor count-direction feedback circuit 62. This circuit 62 determines in which direction the output shaft 101c is turning and then supplies the opposite direction to the count-direction coincidence circuit 25 so that if the input count pulse is counting the counter 70 up and turning the output shaft 101c forward, then the motor feedback pulse counts the counter 70 down for as long as the output shaft 101c turns. Consequently, the motor count-direction feedback circuit 62 generates motor pulses which by way of the line 23, are sent to the anti-coincidence circuit 14. The circuit 14 prevents an input count pulse from the pulse generator 60 from ever reaching the counter 70 at the same time as a motor feedback pulse. Should they ever occur contemporaneously or even nearly contemporaneously, the direction of the counter 70 does not have time to adjust and a pulse could count the counter 70 in the wrong direction which would cause the output shaft 101c to move too far or not far enough. The circuit 14 avoids this eventuality to insure reliable position control over the output shaft 101c. The circuit 14 selects the pulse first occurring at the lines 1 and 23, even if the pulse is first by only a few nanoseconds, and delivers that pulse to the count-direction coincidence circuit 25 with its proper direction signal and thence to the up/down counter 70. The other later arriving pulse is stored until the earlier arriving pulse and its direction signal clear the count-direction coincidence circuit 25. When the pulse and its direction signal clear the respective count-direction coincidence circuit 25, the signal on a line 31 is removed indicating that the count-direction coincidence circuit 25 is not busy. Then the second pulse that was stored in the anti-coincidence circuit 14 is delivered to the respective count-direction coincidence circuit 25 where it is matched with its proper direction signal so that the counter 70 is counted in the proper direction. Referring to FIG. 5, there are shown waveforms on certain lines that further explain the operation. FIG. 5 assumes that two of these pulses applied to the line 1 will be stored in the counter 70 before the motor 101b begins to turn and the encoder 102 produces motor feedback pulses. However, depending on the input count frequency, any number of counts could be stored in the counter 70 before the output shaft 101c begins to turn.

Figure 16:
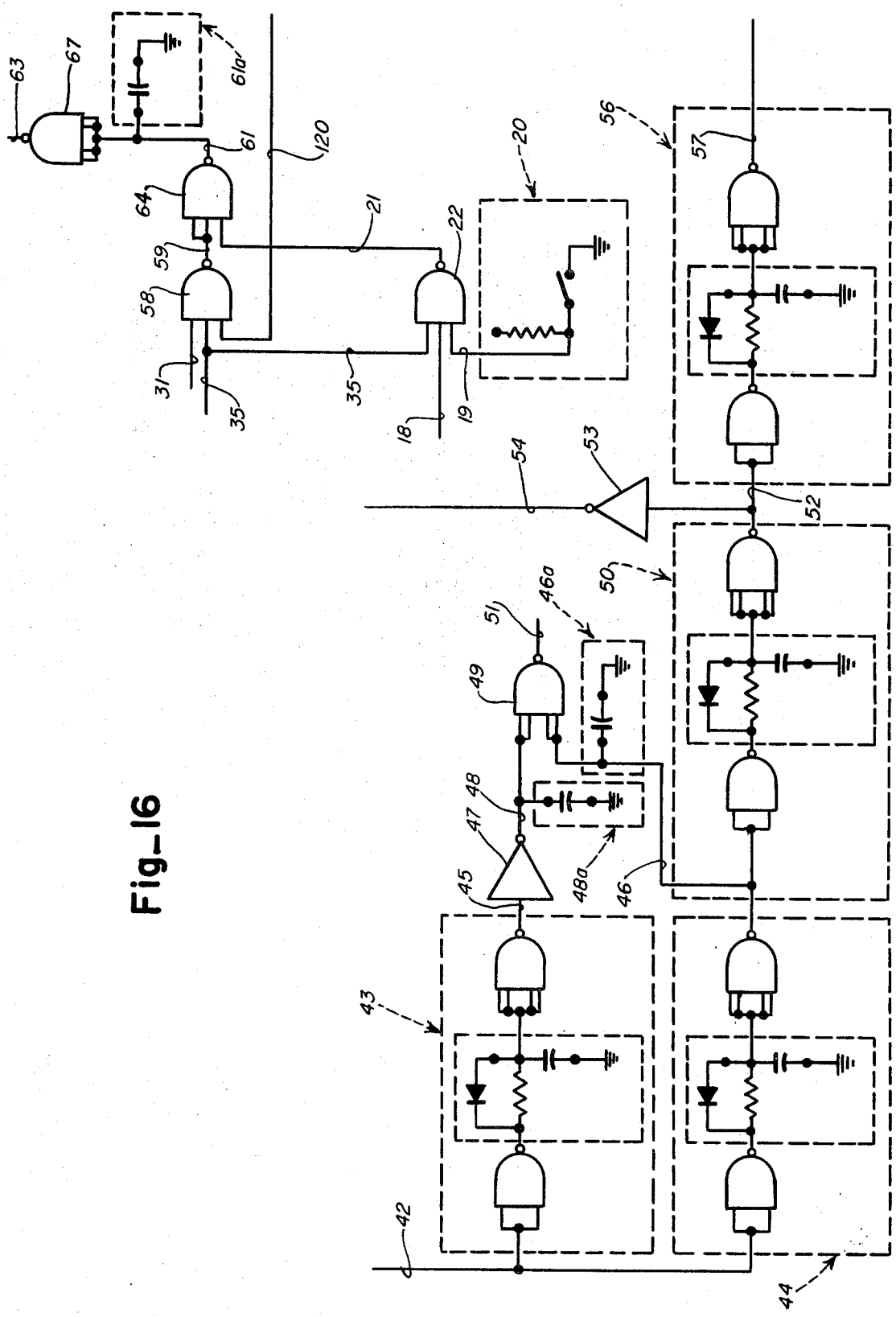
FIG. 16 is a diagrammatic view showing the details of the count direction coincidence circuit.

Referring to FIGS. 1, 5 and 16, the line 35 leading to the count-direction coincidence circuit 25 will receive a busy signal for every pulse whether the pulse is an input one or a feedback one. This busy signal forces any close following pulse to wait until the system is not busy. Every count pulse on the line 18, is delivered to the counter 70 in coincidence with a high direction signal on the line 63, causing the counter 70 to count up, the D/A converter 98 output voltage to rise, and the output shaft 101c to turn in the forward direction. Conversely, every motor feedback pulse is delivered to the counter 70 in conjunction with a low direction signal on the line 63, causing the counter 70 to count down stabilizing the analog voltage on the line 100 to the motor assembly 101, until the input pulses of the line 18 stop. When input pulses cease, then feedback pulses empty the counter 70 to its stable midpoint state. As the counter 70 is emptied, the line 100 zeros and the motor 101b slows and stops turning.

Figure 2:
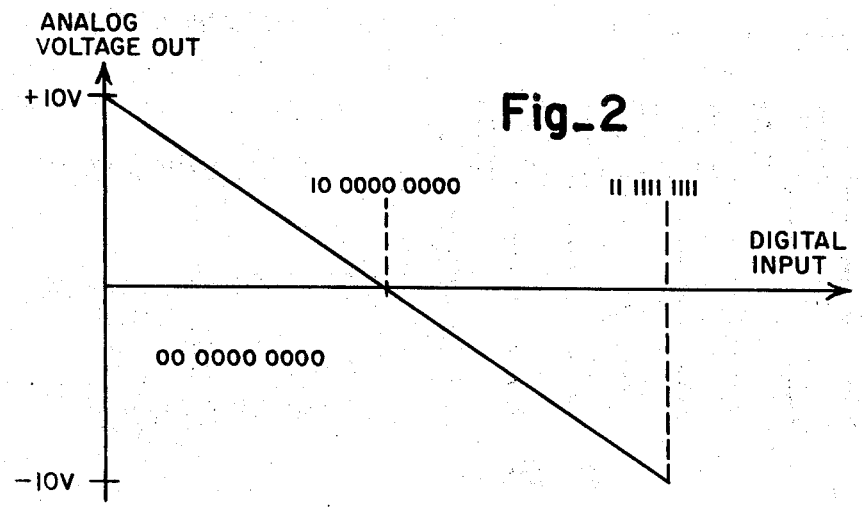
FIG. 2 is a diagrammatic view showing the output voltage from the bipolar digital to analog converter.

The counter 70 is interfaced with the D/A converter 98 by means of a plurality of inverters (not shown) within the counter 70 to invert the signal that is placed into the D/A converter 98. During normal operation of the counter 70, a reset pin (not shown) is clamped to +5 volts so that the counter 70 will not reset. A line 65 is tied to an initialize circuit 66 which maintains the line 65 at ground for a subsstantially fixed period of time after turning power on followed by a low to high transition. This sequence on the line 65 sets the up/down counter 70 to a logic one at each output every time the power is applied to the circuit 66 during the power on function. The number evident in the up/down counter 70 at initialization will be 11 1111 1111. This initialized number is then fed through ten parallel inverters within the counter 70 and appears as the number 00 0000 0000. The most significatnt bit output is then fed into another inverter, also not shown separately, and the output appears as a one or high voltage at a line 88. Therefore, the D/A converter 98 sees the number at lines 88–97 which is 10 0000 0000. The significance of this number is illustrated in FIG. 2 and has been previously discussed. This is the number that drives the analog output line 100 to a zero voltage. A zero voltage supplied to the D.C. torque motor 101b prevents the motor from turning. Accordingly, the initialize circuit 66 prevents the motor 101b from turning by initializing the counter 70 and the D/A converter 98 to the proper static conditions.

The following tables show the relationship of the counter 70, the converter 98, and the motor 101b.

COUNTER UP COUNTS

| Motor Direction | Stationary | Forward | Forward | Forward | Forward |
|---|---|---|---|---|---|
| D/A Output | 0V | +.019V | +.038V | +.057V | +.076V |
| D/A Input Inverted | 1000000000 | 0111111111 | 0111111110 | 0111111101 | 0111111100 |
| Counter Output | 0000000000 | 1111111111 | 1111111110 | 1111111101 | 1111111100 |
| Counter Output | 1111111111 | 0000000000 | 0000000001 | 0000000010 | 0000000011 |
|  |  | 1st Up Count | 2nd Up Count | 3rd Up Count | 4th Up Count |

COUNTER DOWN COUNTS

| Motor Direction | Stationary | Reverse | Reverse | Reverse | Reverse |
|---|---|---|---|---|---|
| D/A Output | 0V | −.019V | −.038V | −.057V | −.076V |
| D/A Input Inverted | 1000000000 | 1000000001 | 1000000010 | 1000000011 | 1000000100 |
| Counter Output | 0000000000 | 0000000001 | 0000000010 | 0000000011 | 0000000100 |
| Counter Output | 1111111111 | 1111111110 | 1111111101 | 1111111100 | 1111111011 |
|  |  | 1st Down Count | 2nd Down Count | 3rd Down Count | 4th Down Count |

It will be observed that counting the counter 70 up one count overflows the counter 70 to an all zero output which is inverted except for the most significant bit which is inverted twice or not at all. This number appears at the input to the D/A converter 98 as a count down of one which consequently causes a positive voltage at the output of the D/A converter 98. Refer to FIG. 2 as well. Therefore, an up count causes motor forward rotation.

If the counter 70 is counted down, the subsequent inverted output appears to be counted up by one. This phenomenon appears at the input to the D/A converter 98, causing a negative analog output which turns the output shaft 101c in the reverse direction.

A voltage limit circuit (not shown) is provided to which all unused input pins 4 on all integrated circuits are tied to prevent the pins 4 from floating at indeterminate voltages. A power supply (not shown) in the preferred embodiment delivers +5 volts to all the integrated circuits and +15 and −15 volts for the D/A converter 98.

Figure 15:
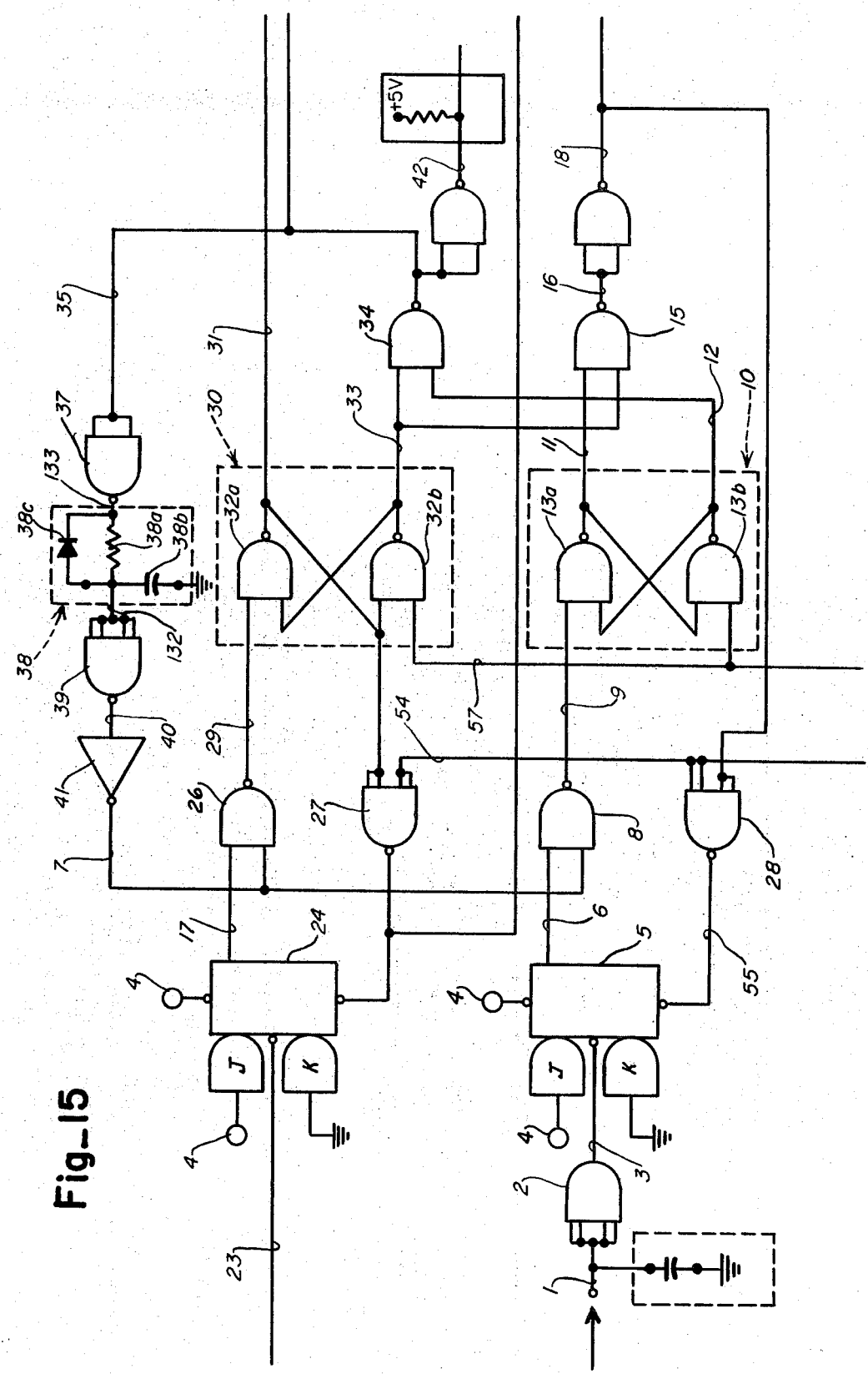
FIG. 15 is a diagrammatic view showing the details of the anti-coincidence circuit.

Referring now to FIG. 15, the details of the anti-coincidence circuit 14 are shown. Included are gates 37 and 39 in combination with the lines 35 and 40, and a discrete component assembly 38 which delivers a programmable time delay. When the line 35 makes a high to low transition, the line 40 likewise makes a high to low transition which is delayed by the values of the discrete component assembly 38. By varying the value of a resistor 38a and capacitor 38b in the assembly 38, the time delay may be varied. When the line 35 makes a low to high transition, the line 40 makes a low to high transition at the same time as shown in FIG. 7. The gate 37 is a nand gate used to invert the signal on the line 35, and the signal on the line 133 is the inversion of the line 35 signal. However, a line 132 is connected to ground by a capacitor 38b which cannot change voltage instantaneously, but must change gradually. The gate 39 is a Schmitt trigger gate which upon sensing a voltage level of 1.6 volts or greater at the input, makes a high to low transition at the output, and upon sensing a level of 0.8 volts or less at the input, makes a low to high transition at the output. The output of the gate 39 does not change unless the input senses these particular levels. Referring now to FIG. 8, there is shown a comparison of input/output transitions between a regular nand gate and a Schmitt trigger nand gate. A diode 38c used in this circuit provides a time delay only during one transition. During the positive going transition at the line 35, the line 133 goes negative. The diode 38c effectively shorts the line 132 to the line 133 and forces the line 132 to discharge the capacitor 38b very rapidly from +5 volts to ground. Consequently, the time delay is nearly zero.

Referring now also to FIG. 10, there is illustrated a standard nand gate and a Schmitt trigger nand gate, both of which operate in the same manner logically. The truth table associated with a nand gate is as follows:

| Input A | Input B | Output |
|---|---|---|
| 0 | 0 | 1 |
| 0 | 1 | 1 |
| 1 | 0 | 1 |
| 1 | 1 | 0 |

Figure 6:
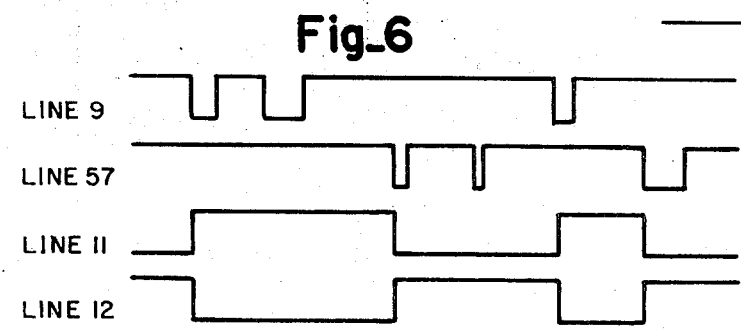
FIG. 6 is a diagrammatic view showing the relative wave-forms associated with the nand gates connected to form flip-flops in the anti-coincidence circuit.
Figure 11:
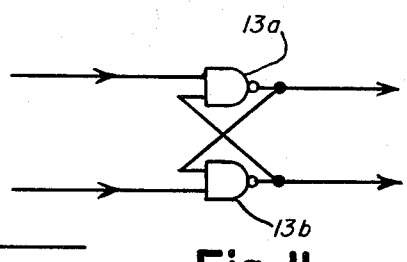
FIG. 11 is a diagrammatic representation of two nand gates connected to create a latching flip-flop circuit.

In the conventional manner, a 1 represents a high voltage and an 0 represents a low voltage. Since a nand gate signifies a not-and function of logic, the output of a nand gate consequently, is a resulting of "anding" the inputs and inverting. FIG. 11 shows a representation of the latter type nand gates 13a and 13b which are the same as nand gates 32a, 32b, and 37. FIG. 6 illustrates the associated waveforms. The particular connections for each pair are those of a latching flip-flop. A negasets the flip-flop outputs, line 11 to a one and line 12 to a zero. This set condition exists until a negative going transition at a line 57, the reset line, resets the flip-flop to its original state with the line 11 at zero volts and the line 12 at +5 volts. The operation of flip-flops 5 and 24, 117 and 127 is the same except that the flip-flop will set only if the J input, lines 109 and 126, are high. If the J input is low, the flip-flop will reset. The lines 3, 23, 116 and 137 are the set lines. The lines 55 and 130 are the reset lines. It should be understood that the K input for flip-flops 5 and 24, 117 and 127 are grounded.

In the operation of the anti-coincidence circuit 14, a string of input pulses arriving at the line 1 is filtered and gated through a gate 2 to the line 3. The line 55 is high so that the first pulse at the line 3 sets the flip-flop 5. Therefore, a line 6 makes a low to high transition. Since a line 7 is high, the line 6 moving high causes a gate 8 to emit a low going signal which sets a flip-flop 10. Therefore, the line 11 goes high and the line 12 goes low. Since a flip-flop 30 is unset, a line 33 is high. With the line 33 high and the line 12 going low, the line 35 will make a low to high transition to indicate a busy condition and which, in turn, causes the line 40 to go high immediately and the line 7 to go low. This immediately forces the flip-flop 24 to store any motor feedback pulse from the line 23, until the busy signal is removed. This is accomplished because the line 7 goes low as soon as a busy signal is generated. Now even if the flip-flop 24 is set and a line 17 goes high, a line 29 will still be high until the busy signal is removed. When that happens, the line 7 goes high and only then can the line 29 set the flip-flop 30. Therefore, one notes that any pulse into the system must reach the counter 70 before the next pulse is allowed out of the buffer flip-flops 5 or 24 into the system.

The setting of the flip-flop 10 forces the line 11 high. Since the line 33 is high, a gate 15 forces a line 16 low and the line 18 high. The line 18 is directed into the respective count-direction coincidence circuit 25 as is the busy signal, line 35. Likewise, when the busy line 35 goes high, a line 42 or an inverted busy signal goes low. This, too is applied to the respective count-direction coincidence circuit 25.

Any input count pulse sets the flip-flop 5 and the flip-flop 10 enables the busy signal on the line 35, and the count signal on the line 18. While this is occurring, no motor feedback pulse can feed into the circuit 14 any farther than the flip-flop 24 where it must wait until the anti-coincidence circuit 14 is not busy and for a short interval thereafter. The same is true of a motor feedback pulse that generates a busy signal. This forces any near simultaneous input count pulse to be stored in the flip-flop 5 until a condition of not being busy is obtained. Any input count pulse that arrives at the flip-flop 5 nearly simultaneously with a motor feedback pulse at the flip-flop 24 will generate a race to set the flip-flops 5 or 24. The setting of the first flip-flop or the flip-flops 5 and 24 immediately enables a busy command which prevents the other flip-flop from doing anymore than being set and storing the pulse until the leading pulse has cleared through the circuitry. Referring to FIG. 12, there is shown the waveforms of the anti-coincidence circuit 14 and the count-direction coincidence circuit 25.

Referring now to FIG. 16, the details of the count direction coincidence circuit 25 are shown in greater detail. As the line 42 from the anti-coincidence circuit 14 goes low, the output of the delay circuits 43 and 44 go low after different time intervals. A line 45 signal with the shorter time delay is gated by an inverter 47 which causes a line 48 to go high. Somewhat later, a line 46 goes low after finishing its delay. This gives two simultaneous high signals on the inputs of a gate 49 for a short period of time. The result is that the line 51 receives a negative pulse for a short time, which is delivered to the counter 70 a short time after the direction signal arrives there as a result of the delay circuits 43 and 44 delaying the count pulse. The line 51 signal counts the counter 70.

After the signal on the line 46 goes low, it passes to a delay circuit generally designated as 50 which causes a line 52 to go low after some more delay. An inverter 53 causes a line 54 to go high after a further delay. The line 54 going high is combined with the already present high at the line 18 in the anti-coincidence circuit 14 (FIG. 15). This combination is gated through a gate 28 causing a low on the line 55 which resets the flip-flop 5. The line 54 does not reset the flip-flop 24 since the flip-flop 30 was not set which prevents a high signal from appearing at the line 31 and a gate 27. Therefore, the line 54 going high resets only the flip-flop of the pulse that caused the busy signal. In this case, the flip-flop 5 is reset since this flip-flop was set by an input count pulse which caused a busy signal.

Also connected to the line 52 is another delay circuit indicated generally as 56. The output on the line 57 of this circuit goes low somewhat after the delayed line 52 signal makes a high to low transition and resets either the flip-flop 10 or the flip-flop 30. Whichever flip-flop that was set will be reset. The other flip-flop cannot be set at this time because of the signal on the line 7. When the delay circuit 56, in the count-direction coincidence circuit 25, has caused the line 57 signal which resets the flip-flop 10, the line 11 goes low, the line 33 goes high, and therefore, the line 16 goes high and the line 18 goes low.

The flip-flop 10 being reset has another effect on the anti-coincidence circuit 14. The line 12 goes high. The line 33 is high. Therefore, a gate 34 produces a negative going transition which is delayed by the gates 37 and 39 and the assembly 38, and appears as a delayed negative going signal at the line 40. An inverter 41 inverts the delay and delivers a delayed positive going signal at the line 7. This delay reaches the gates 26 and 8. If either flip-flop 5 or 24 was set, this delayed positive going signal allows any stored pulse in the flip-flops 5 or 24 to proceed through the gates 8 or 26 respectively, and set one of the flip-flops 10 or 30.

Continuing to refer to FIG. 16, the count-direction coincidence circuit 25 includes a gate 22. The input on the line 19 which is governed by a switch assembly 20, determines the direction which the counter 70 is counted (when a preselected pulse train is introduced on the line 1) and the output shaft 101c turns. If the line 19 is high, a line 21 will go low, a line 61 will go high, and the line 63 will go low. Therefore, each input pulse will count the counter 70 down, the output of the count inverters will count up, the D/A converter 98 output will go negative, and the output shaft 101c will turn in the reverse direction. If the line 19 is low, the line 21 is high, the line 61 is low, and the line 63 is high, the counter 70 counts up, the inverters count down, the D/A converter 98 analog output goes high and the output shaft 101c turns in the forward rotational mode. Capacitors (unnumbered) are grounded to provide electrical noise filtering and are used within circuit assemblies denoted by the numerals 46a, 48a, and 61 a.

Referring now to FIG. 17 as well as FIGS. 1, 15, and 16, the details of the motor count-direction feedback circuit 62 are shown in greater detail. As discussed above, as an input count pulse reaches the counter 70, the counter 70 starts counting, the analog output of the D/A converter 98 produces an output voltage, and the output shaft 101c starts turning. As the output shaft 101c turns, a tachometer 101d engaging the output shaft 101c is rotated to produce a signal which passes by a line 101e to the amplifier 101a to prevent runaway. More specifically, the tachometer 101d furnishes a velocity signal used for velocity loop feedback which is needed to turn the motor 101b at a stable speed.

Assuming that the output shaft 101c is rotating in a forward direction, the voltage at the analog output of the D/A converter 98 is increasing. The number at the input to the D/A converter 98 is counting down and because of the inverters, the counter 70 is counting up. It follows that the input count pulse is arriving at the counter 70 coincident with a high direction signal. During forward motor rotation, there is a predetermined direction signal applied to the counter 70 coincident with the input pulse. As a result of the motor 101b and the encoder 102 turning in a forward mode, the square wave generated by the encoder 102 at the line 103 leads that at the line 104 by one-fourth a period. Circuit assemblies 105 and 108 provide a delay of the waveforms on the lines 103 and 104 for the purpose of noise rejection. Referring also to FIG. 13, more detail is shown with respect to the waveforms generated by forward motor rotation. The delay circuit assembly 105 comprising an inverter 105a, a discrete component assembly 105b and a gate 105c has no diode. Accordingly, there is a similar delay with either the positive to negative transition or the negative to positive transition on the line 104. The circuit assembly 105 and the circuit assembly 108 are similar. The time delay that they create on either transition eliminates any noise from the encoder 102 unless the noise makes a transition and lasts longer than the time delay. These circuits 105 and 108 eliminate all noise spikes of short and medium duration and prevent erroneous consequences by eliminating these noise spikes. All critical inputs and outputs of the entire system are effectively filtered in this manner or simply by using a capacitor and a Schmitt trigger as in the case of the gate 2 and the input on the line 1 which is part of the anti-coincidence circuit 14 in FIG. 15.

The circuit consisting of the lines 110 and 123, a Schmitt trigger gate 122, and a discrete component assembly 121 accepts a filtered waveform A and delivers a negative going pulse when waveform A goes high as shown in FIG. 9. A positive going transition of the line 110 will apply a high signal to a capacitor 121a. Since the capacitor 121a cannot charge instantaneously, a positive voltage spike will appear at a line 134 which is gated through the Schmitt trigger gate 122 and appears at the line 123 as a voltage pulse. This circuit forms a negative voltage pulse for every positive going transition of waveform A. The duration of this pulse is controlled by the values of a resistor 121b and the capacitor 121a. The diode (not shown) of assembly 121 prevents any negative going pulses from appearing at the line 134 by clamping the line 134 above ground potential.

The circuit consisting of a discrete component assembly 112, a gate 113, and the lines 114 and 136, forms a negative going pulse in response to a negative going transition of waveform A which is first inverted by a gate 111 and directed to the assembly 112 by a line 107. More specifically, this composite circuit creates a negative going pulse every time the inverted waveform A goes positive, i.e., when waveform A on the line 110 goes negative. Refer to FIG. 9 for a graphic representation. Inverters 115 and 124 provide positive going pulses every time a negative going pulse is fed to them in the manner described above. The line 109 signal is a delayed form of waveform B1 on line 104 (FIG. 13). The signal on the line 109 is inverted by a gate 135 and applied to the J input of the flip-flop 127 on the line 126. The line 109 signal is applied to the J input of the flip-flop 127. If the J input is high when a positive going pulse arrives on either the line 137 or 116, the corresponding flip-flop 117 or 127 will be set. If the J input is low when the positive pulse arrives at the flip-flop, the flip-flop will remain in its reset state. It will be observed that the signal on the lines 123 and 114 are anded and inverted by a gate 128 to produce an output on the line 23 that becomes the motor feedback count which is applied to the flip-flop 24 of the anti-coincidence circuit 14 (FIG. 13). When the output shaft 101c rotates forward each flip-flop delivers a low going pulse to the gate 128 from the lines 114 and 123, whereby a motor feedback pulse is generated at the line 23. The direction level at a line 120 which is high going as a result of the forward rotation of the output shaft 101c is forced to wait at a gate 58 of the count direction coincidence circuit 25 until the motor feedback pulse generates a busy signal on the line 35, and sets the flip-flop 30 at the line 31. When the motor feedback pulse generates a busy signal at the line 35 and a motor signal at the line 31, the motor feedback direction is applied to the counter 70 through the lines 59, 61, and 63 through the nand gates 64 and 67. Similarly, with an input count pulse to apply a direction signal to the input count pulse, a busy signal at the line 35 must appear as well as a count signal on the line 18, indicating that an input count signal is nearly ready to be applied to the counter 70.

As previously stated, the line 120 signal is a high going pulse if the motor 101b is turning forward. Since the motor direction actually appears at the lines 118 and 129, these directions must be inverted by a gate 119 to count the counter 70 in the opposite direction to that direction causing rotation. Therefore, in the forward direction, a high signal is evident at the line 120 indicating direction. Therefore, the line 59 is low, the line 61 is high, and the line 63 is low for the motor feedback count. One notes that the low signal at the line 63 for the motor feedback pulse is opposite to the high originally applied there by every input count pulse. Therefore, input count pulses do count the counter 70 up while motor feedback pulses empty the counter 70.

Referring now to FIG. 14, there are shown the waveforms of the motor count-direction feedback circuit 62 with a reverse rotation of the output shaft 101c. The line 120 is low, the line 59 is high, the line 61 is low, and the line 63 is high. Therefore, since the input count pulse has a low direction to turn the output shaft 101c in reverse, the motor feedback direction is high to count the counter 70 up again.

Summarizing, the input count pulses count the counter 70 in one direction to turn the direct current torque output shaft 101c and the encoder 102 in that direction. The encoder 102 delivers a feedback pulse train to count the counter 70 in the opposite direction.

The anti-coincidence circuit 14 is provided to prevent input pulses and their proper direction from overlapping with any feedback pulses at their proper direction. The count-direction coincidence circuit 25 is provided to deliver the proper direction signal coincidentally to the counter 70 with that direction's respective count. Position control is provided by being able to deliver a given number of input pulses to the up/down counter 70 while delivering feedback pulses to the counter 70 during the same period of time. The purpose of the motor feedback pulse is to remove a count per input pulse without losing or gaining either an input pulse or a feedback pulse. By sufficient angular displacement of the output shaft 101c, enough motor count feedback pulses are delivered to the counter 70 to return the counter 70 to its original state.

It is to be understood that the preferred embodiment of the control mechanism has been described in a particularly desired form and that various other forms may be utilized without departing from the invention. More particularly, voltage levels and specific logic circuitry may differ substantially. The digital to analog converter need not be bipolar if it is desired to turn the motor only in one direction. The frequency at which input pulses are put into the system may vary with the particular system requirements. Similarly, the digital to analog converter need not be of the inverting type. The invention also has application for controlling the angular position of a shaft which may not necessarily be part of a motor. In addition, suitable mechanical linkage such as rack and pinion gears may be provided to convert the angular motion into linear motion which may be utilized to position a mechanism such as a grinding wheel in and out during a grinding cycle.

It should be apparent from the above description, that the instant control mechanism for a machine tool has numerous advantages over the prior art apparatus. These include simplicity with an associated improvement in reliability. The apparatus of the invention will also be less cumbersome and less expensive to to manufacture. The use of Schmitt trigger nand gates introduces time delays which result in a signal which is not sensitive to noise spikes and which contribute to very sensitive and selective control of the motor output shaft.

We claim:

1. A control arrangement for a servomotor system, the combination comprising:

counting means for counting a series of pulses in increasing or decreasing order and producing digital output signals representative of the pulses counted, converter means connected in controlling relation with the servomotor system and operable in response to receipt of the digital output signals from said counting means for supplying a corresponding analogue signal to the servomotor system to effect rotational movement of the servomotor, control means for supplying pulses to said counting means in increasing or decreasing order with each pulse corresponding to a unit of rotational movement of the servomotor system, said control means being operable in response to receipt of a series of positioning signals representative of a predetermined rotational position for supplying corresponding pulses to said counting means in corresponding increasing or decreasing order, encoding means operable in response to the rotational movement of the servomotor system for producing feedback signals each indicative of a unit of rotational movement of the servomotor to the predetermined position, and said control means being operable in response to receipt of the feed-back signals from said encoding means for supplying corresponding pulses to said counting means in an opposite increasing or decreasing order to reduce the count of pulses and the corresponding analogue signal being supplied to said converter means as the rotational movement of the servomotor approaches the predetermined rotational position.

2. A control arrangement for a servomotor system according to claim 1:

said control means further including anti-coincidence means for re-ceiving the positioning signals and the feedback signals, said anti-coincidence means permitting operation of said control means in response to only one of the signals at a time, and said anti-coincidence means being operable to store the other received signal for subsequent operation of said control means.

3. A control arrangement for a servomotor system according to claim 1:

said converter means being operable to produce analogue signals extending over a bipolar range to effect forward rotational movement of the servomotor system with analogue signals of one polarity and reverse rotational movement of the servomotor system with analogue signals of the opposite polarity, said counting means producing a range of digital output signals corresponding to the bipolar range of analogue signals and being operable in response to an adding directional signal for counting incoming pulses in an increasing order and being operable in response to a subtracting directional signal for counting incoming pulses in a decreasing order, said control means being operable in response to receipt of positioning signals corresponding to a predetermined rotational position in one rotational direction for supplying a corresponding adding or subtracting directional signal to said counting means to control the counting of incoming pulses in a corresponding increasing or decreasing order to effect rotational movement of the servomotor in the one rotational direction to the predetermined position, and said control means being operable in response to receipt of feedback signals from said encoding means produced in response to rotational movement of the servomotor in the one rotational direction for supplying an opposite corresponding adding or subtracting directional signal to said counting means to control the counting of incoming pulses in a corresponding increasing or decreasing order to reduce the count of pulses and the corresponding analogue signal produced by said converter means as the rotational movement of the servomotor approaches the predetermined rotational position.

4. A control arrangement for a servomotor system according to claim 3:

said encoding means being operable to produce first and second series of phase related feedback signals with the first series of feedback signals leading in phase the second series of feedback signals in response to rotational movement of the servomotor system in a first direction and with the first series of feedback signals lagging in phase the second series of feedback signals in response to rotational movement of the servomotor system in a second direction, and said control means including motor direction feedback means receiving the first and second series of feedback signals from said encoding means and being operable to detect the direction of rotational movement of the servomotor and supply a corresponding adding or subtracting directional signal to said counting means to control the counting of pulses produced in response to receipt of the feedback signals.

5. A control arrangement for a servomotor system according to claim 3:

said control means further including anti-coincidence means for receiving the positioning signals and the feedback signals, said anti-coincidence means permitting operation of said control means in response to only one of the signals at a time, and said anti-coincidence means being operable to store the other received signal for subsequent operation of said control means.

* * * * *

PO-1050
(5/69)

UNITED STATES PATENT OFFICE
CERTIFICATE OF CORRECTION

Patent No. 3,766,459                 Dated       October 16, 1973

Inventor(s) MICHAEL D. MCINTOSH ET AL

It is certified that error appears in the above-identified patent and that said Letters Patent are hereby corrected as shown below:

In the Abstract, line 7, for "an input having" substitute --signals from--; line 8, change "inputs" to --delivers--; line 9, after "pulses" insert --to determine the angular position of the motor shaft--; line 11, after "of" insert --feedback--, same line, after "given" insert --increments of--. Column 2, line 25, for "wave-forms" read --waveforms--. Column 6, line 63, for "subsstantially" read --substantially--, Column 7, line 25, for "Iuput" read --Input--. Column 14, line 7, for "feed-back" read --feedback--; line 18, for "re-ceiving" read --receiving--.

Signed and sealed this 9th day of April 1974.

(SEAL)
Attest:

EDWARD M.FLETCHER,JR.           C. MARSHALL DANN
Attesting Officer                  Commissioner of Patents